United States Patent
Lowry et al.

(10) Patent No.: US 11,796,397 B2
(45) Date of Patent: Oct. 24, 2023

(54) GEARBOX TEMPERATURE MEASUREMENT DEVICE

(71) Applicant: Fairfield Manufacturing Company, Inc., Lafayette, IN (US)

(72) Inventors: Michael Jeffrey Lowry, Indianapolis, IN (US); David E. Cornell, Lafayette, IN (US)

(73) Assignee: FAIRFIELD MANUFACTURING COMPANY, INC., Lafayette, IN (US)

( * ) Notice: Subject to any disclaimer, the term of this patent is extended or adjusted under 35 U.S.C. 154(b) by 0 days.

(21) Appl. No.: 17/655,250

(22) Filed: Mar. 17, 2022

(65) Prior Publication Data

US 2022/0268642 A1  Aug. 25, 2022

Related U.S. Application Data

(62) Division of application No. 16/271,375, filed on Feb. 8, 2019, now Pat. No. 11,313,740.

(51) Int. Cl.

| G01K 1/12 | (2006.01) |
|---|---|
| G01K 13/08 | (2006.01) |
| G01K 1/024 | (2021.01) |
| F16H 57/02 | (2012.01) |
| F16H 57/04 | (2010.01) |
| G01K 17/00 | (2006.01) |

(52) U.S. Cl.
CPC ............. *G01K 13/08* (2013.01); *F16H 57/02* (2013.01); *F16H 57/0482* (2013.01); *G01K 1/024* (2013.01); *G01K 1/12* (2013.01); *G01K 17/00* (2013.01)

(58) Field of Classification Search
CPC ........ G01K 13/08; G01K 1/024; F16H 57/02; F16H 57/0482
USPC ..................................................... 340/870.17
See application file for complete search history.

(56) References Cited

U.S. PATENT DOCUMENTS

| 4,016,762 A | 4/1977 | Payne |
|---|---|---|
| 4,311,036 A | 1/1982 | Kajdas et al. |
| 4,354,183 A | 10/1982 | Weeks et al. |
| 4,524,611 A | 1/1985 | Richon et al. |
| 4,518,962 A | 5/1985 | Imose et al. |

(Continued)

FOREIGN PATENT DOCUMENTS

| AU | 2003268874 A1 * | 7/2004 | ......... B60C 23/0493 |
|---|---|---|---|
| CA | 2814557 A1 * | 4/2012 | ............... A61B 5/07 |

(Continued)

OTHER PUBLICATIONS

Silva, D. et al., "Measuring Torque and Temperature in a Rotating Shaft Using Commercial SAW Sensors," Sensors, vol. 17, No. 7, Jul. 2, 2017, 23 pages.

*Primary Examiner* — Gail Kaplan Verbitsky
(74) *Attorney, Agent, or Firm* — McCoy Russell LLP

(57) ABSTRACT

Systems and methods for a temperature measurement device. A transmission includes a rotatable housing. The temperature measurement positioned on a transmission housing. The interior volume of the rotatable housing is partially filled with lubricant of transmission components residing within the interior volume of the housing. The temperature measurement device in contact with the lubricant and in communication with a device exterior to the transmission.

18 Claims, 13 Drawing Sheets

(56) References Cited

U.S. PATENT DOCUMENTS

| | | | |
|---|---|---|---|
| 5,257,863 A * | 11/1993 | Chu | G01K 13/08 |
| | | | 374/208 |
| 6,035,988 A | 3/2000 | Ito et al. | |
| 6,196,057 B1 | 3/2001 | Discenzo | |
| 6,283,891 B1 | 9/2001 | Wozniak et al. | |
| 6,360,850 B1 * | 3/2002 | Odisho | F16D 66/026 |
| | | | 340/454 |
| 6,470,735 B1 | 10/2002 | Bell | |
| 6,546,785 B1 | 4/2003 | Discenzo | |
| 6,617,968 B1 | 9/2003 | Odisho et al. | |
| 6,619,118 B1 | 9/2003 | Keck | |
| 6,663,279 B1 | 12/2003 | Heinzelmann et al. | |
| 6,879,935 B2 | 4/2005 | Keck | |
| 6,921,197 B2 * | 7/2005 | Aubel | B60C 23/0493 |
| | | | 73/146 |
| 6,964,518 B1 * | 11/2005 | Jagt | G01K 13/08 |
| | | | 374/154 |
| 7,104,116 B2 | 9/2006 | Discenzo | |
| 7,278,953 B2 | 10/2007 | Meyer et al. | |
| 7,539,549 B1 | 5/2009 | Dicenzo et al. | |
| 7,581,434 B1 | 9/2009 | Dicenzo et al. | |
| 7,766,547 B2 * | 8/2010 | Weppenaar | G01L 9/0072 |
| | | | 73/866.5 |
| 7,874,724 B2 | 1/2011 | Okoren et al. | |
| 7,914,250 B2 | 5/2011 | Behera et al. | |
| 3,029,188 A1 | 10/2011 | Park | |
| 8,545,365 B2 | 10/2013 | Miyazaki et al. | |
| 9,035,800 B2 | 5/2015 | Bommer et al. | |
| 9,329,579 B2 | 5/2016 | Slupsky et al. | |
| 9,423,290 B2 | 8/2016 | Sakaguchi et al. | |
| 9,589,686 B2 | 3/2017 | Potyrailo et al. | |
| 9,614,475 B2 | 4/2017 | Nardin | |
| 9,746,452 B2 | 8/2017 | Worden et al. | |
| 9,915,585 B2 | 3/2018 | Pettersson | |
| 9,933,337 B2 | 4/2018 | White et al. | |
| 9,988,036 B2 | 6/2018 | Nefcy et al. | |
| 10,018,613 B2 | 7/2018 | Potyrailo et al. | |
| 10,030,811 B2 | 7/2018 | Schleif et al. | |
| 10,190,673 B2 | 1/2019 | Creech et al. | |
| 11,047,617 B1 | 6/2021 | Bassler et al. | |
| 2004/0077457 A1 | 4/2004 | Serebrennikov et al. | |
| 2004/0118196 A1 | 6/2004 | Landes et al. | |
| 2007/0167145 A1 | 7/2007 | Bonnenfant | |
| 2007/0186648 A1 | 8/2007 | Harmon et al. | |
| 2008/0184795 A1 | 8/2008 | Woodard | |
| 2008/0227235 A1 * | 9/2008 | Theuss | G01L 19/148 |
| | | | 438/53 |
| 2008/0283351 A1 | 11/2008 | Sasaki et al. | |
| 2011/0029156 A1 | 2/2011 | Vernacchia | |
| 2012/0294331 A1 | 11/2012 | Morgari et al. | |
| 2014/0010265 A1 * | 1/2014 | Peng | G01L 17/00 |
| | | | 374/143 |
| 2015/0268111 A1 * | 9/2015 | Hedtke | G01K 1/14 |
| | | | 374/100 |
| 2016/0047706 A1 * | 2/2016 | Maruta | G01H 17/00 |
| | | | 73/49.1 |
| 2020/0158228 A1 | 5/2020 | Ohkawa | |
| 2021/0062721 A1 | 3/2021 | Dupays et al. | |

FOREIGN PATENT DOCUMENTS

| | | | | |
|---|---|---|---|---|
| CN | 207364053 U | * | 5/2018 | |
| CN | 108723710 A | * | 11/2018 | |
| CN | 209953819 U | | 1/2020 | |
| EP | 1843138 A1 | | 10/2007 | |
| ES | 2529249 T3 | * | 2/2015 | F16B 31/00 |
| JP | 2003269447 A | | 9/2003 | |
| JP | 2006005978 A | | 1/2006 | |
| JP | 2010048397 A | | 3/2010 | |
| JP | 2021167777 A | | 10/2021 | |
| KR | 101110482 B1 | | 2/2012 | |
| KR | 20130040545 A | * | 4/2013 | |
| KR | 101613127 B1 | | 4/2016 | |
| KR | 20190033671 A | * | 4/2019 | |
| KR | 102284192 B1 | | 8/2021 | |
| KR | 102478512 B1 | * | 12/2022 | |
| WO | 2011104433 A1 | | 9/2011 | |
| WO | WO 2018118204 A | * | 6/2018 | |

* cited by examiner

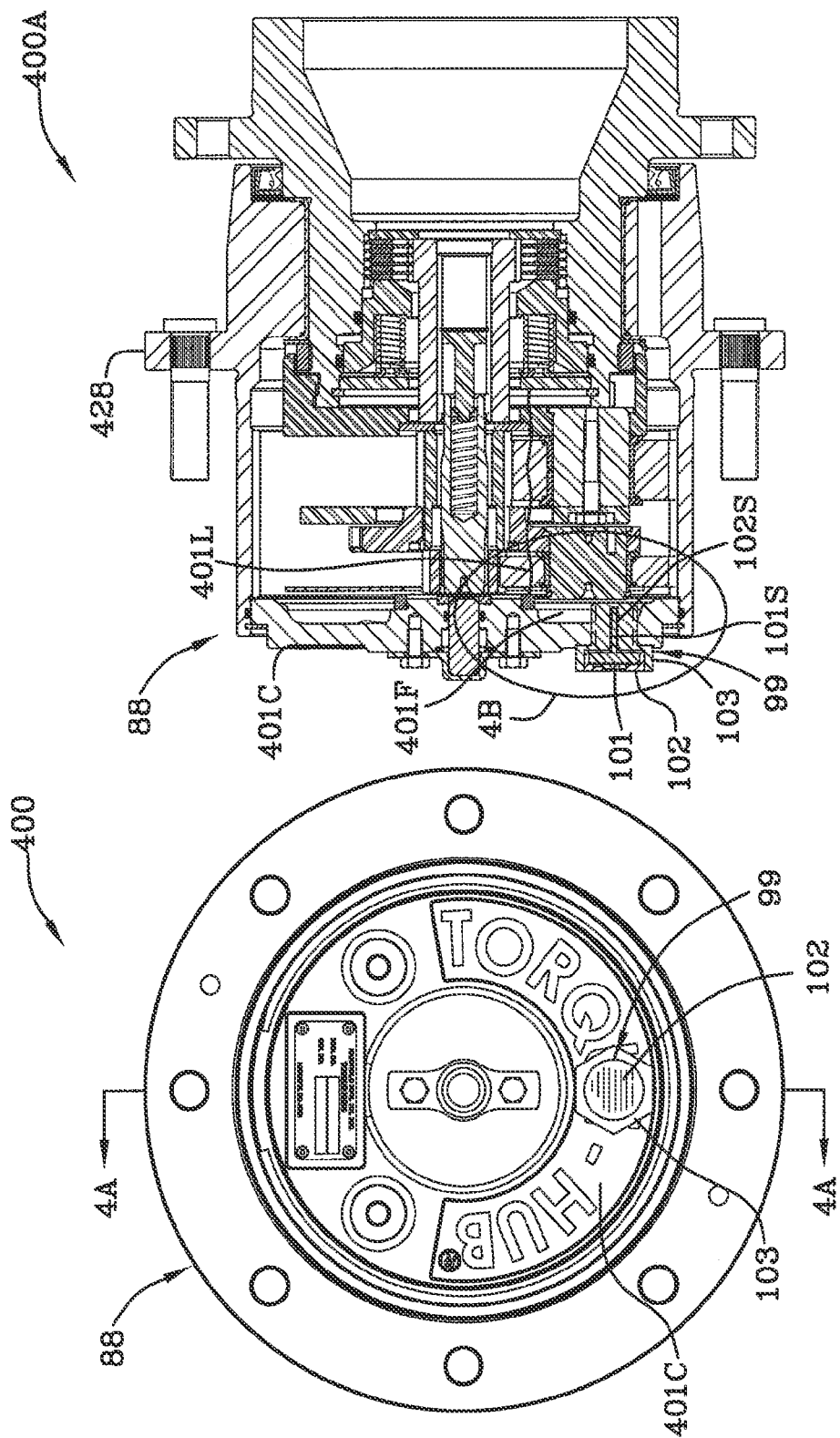

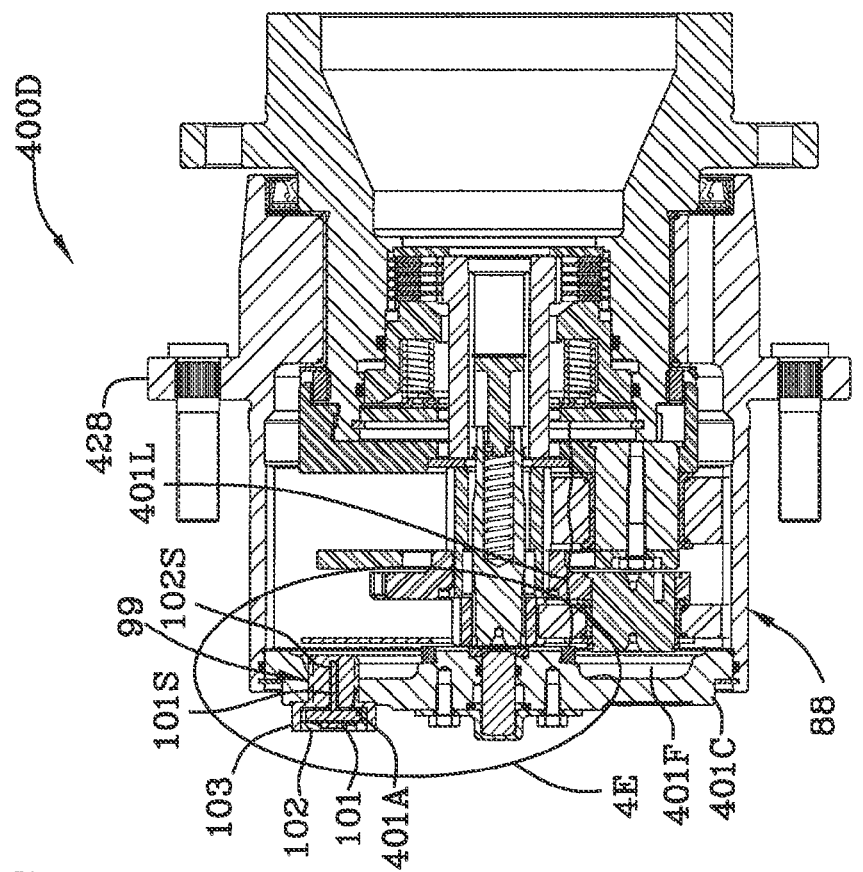
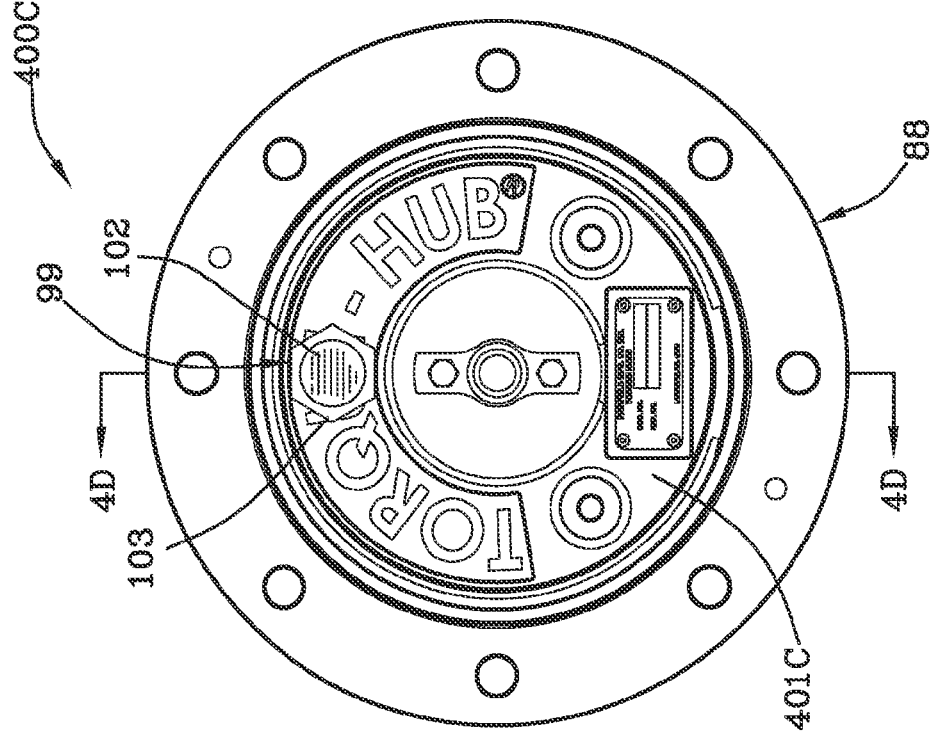
FIG. 4D
FIG. 4C

GEARBOX TEMPERATURE MEASUREMENT DEVICE

CROSS REFERENCE TO RELATED APPLICATION

The present application is a divisional of U.S. Non-Provisional Patent Application Ser. No. 16/271,375, entitled "GEARBOX TEMPERATURE MEASUREMENT DEVICE", and filed on Feb. 8, 2019. The entire contents of the above-listed application are hereby incorporated by reference for all purposes.

FIELD OF THE INVENTION

The invention is in the field of the wireless gearbox temperature measurement devices.

BACKGROUND OF THE INVENTION

Mechanical components, including gearboxes, wear over time and eventually experience failure. It is helpful for the equipment operator to understand when failure is approaching so that corrective action can be taken to prevent the component failure from occurring. Indications of impending gearbox failure include an increase in temperature, increased vibration levels of specific parts, and a change in oil chemistry.

Presently, most mechanical components, particularly those in mobile equipment, do not have this condition monitoring. Although periodic maintenance and replacement of the mechanical components results in failures being avoided, the information that could be used to prevent failures is not available.

U.S. Pat. No. 7,581,434 to Discenza et al. states in the Abstract thereof as follows: "A system that facilitates device and/or machinery diagnostics, prognostics and control by way of condition sensing, such as sensing the condition of the device and/or a fluid of the device (e.g., fluid health indicators). The system can employ a plurality of sensors to determine a current state and estimate a future state of the fluid and/or device, as well as providing control of the device, e.g., in order to increase the remaining useful life of the fluid and/or operation of the device. The sensors can communicate wirelessly with each other, with the device, and/or with a central control system that provides, e.g., sensor fusion, prognostics and control integration. In addition, the sensors can be powered locally based upon the physical or chemical properties of the environment."

U.S. Pat. No. 9,329,579 to Siupsky et al. states in the Abstract thereof as follows: "A wireless sensor device includes a processor connected to a wireless transmitter and at least one sensor, and a power source connected to power the processor and the wireless transmitter. The processor has two or more states. An internal control element senses at least one predetermined condition. The internal control element switches the processor between states based on the occurrence of at least one predetermined condition. A molded body encloses at least the processor, the wireless transmitter, and the internal control sensor. The internal control sensor is physically isolated within the molded body."

U.S. Pat. No. 9,746,452 to Worden et al. states in the Abstract thereof as follows: "System including a sensor configured to be disposed within a reservoir of a machine having moving parts that are lubricated by a liquid in the reservoir. The sensor is configured to obtain a measurement of the liquid that is representative of at least one of a quantity or quality of the liquid in the reservoir. The system also includes a device body operably coupled to the sensor. The device body has a processing unit that is operably coupled to the sensor and configured to generate first data signals representative of the measurement of the liquid. The device body also includes a transmitter that is configured to wirelessly communicate the first data signals to a remote reader."

U.S. Pat. No. 9,933,337 to White et al. states in the Abstract thereof as follows: "A wireless sensor for a wheel end assembly of a heavy-duty vehicle is provided. The wheel end assembly includes a wheel hub and a hub cap mounted on the wheel hub. The sensor includes mounting means disposed in the hub cap. Sensing means are mounted on the mounting means to sense at least one condition of the vehicle. A processor is mounted on the mounting means and is electrically connected to the sensing means to process data from the sensing means. Communication means are mounted on the mounting means and are electrically connected to the processor to communicate the processed data to a user. An electrical energy storage device is mounted on the mounting means and is electrically connected to the sensing means, the processor and the communication means, enabling the sensor to be independent from the vehicle power supply. The sensor also accommodates components of a tire inflation system."

U.S. Patent Application Publication No. 2011/0029156 A1 to Vernacchia et al. states in the Abstract thereof as follows: "A wireless sensor System for a transmission and other powertrain components in a motor vehicle includes a wireless sensor connected to a component of the motor vehicle. The wireless sensor includes an antenna in communication with a wireless power source and with a wireless transceiver. The wireless power source includes an emitter that creates an electromagnetic resonance between the emitter and the sensor. The wireless transceiver is in communication with the sensor and sends and receives signals to and from the wireless 550."

PCT Patent Application Publication No. WO 2011/104433 A1 to ESPOTEL Oy states in the Abstract thereof as follows: "A system for monitoring the condition of planetary gears, the system comprising a base station (7) including an induction antenna (8) for energy transfer and wireless data transfer means, and a wireless sensor device (9) mounted in connection with the planetary wheel of the planetary gear, the device comprising means (11) for receiving energy transmitted by induction, means (13) for storing energy transferred by induction for the operation of the sensor device, measuring sensors (10, 15) for collecting and storing condition monitoring data, and wireless data transfer means (11, 12, 8) for transmitting the measurement results to the base station (7)."

SUMMARY OF THE INVENTION

The wireless gearbox temperature measurement device measures conducted temperature of the oil (hydraulic fluid) within the gearbox (transmission) and transmits it to a device that can be accessed by the user or transmits it to a device that is part of a control system of the vehicle. It is important to note that the gearbox may include a housing that rotates. The temperature measurement device in a rotating gearbox is alternately in the oil within the gearbox and the atmosphere above the oil in the gearbox.

The various components of a rotating gearbox such as shafts, splines, sun gears, input planet gears, input planet carriers, output sun gears, output planets, and output planet carriers, housing, housing ring gears, bearings, etc. are alternately submersed in and out of the oil within the gearbox. In a rotating gearbox, the temperature measurement device is rotated with the housing of the gearbox. In the rotating gearbox, the temperature measurement device is located in the rotatable cover plate which rotates with the rotatable housing. Alternatively, the temperature measurement device can be located in the rotatable housing if there is a position available that does not interfere with various components within the rotating gearbox.

As used herein, "oil" means the "lubricating oil" within the gearbox. As used herein, "gearbox" means the "transmission." The gearbox is powered by a motor and the motor may be an electric motor or a hydraulic motor. The signal transmission is done using wireless communication, which can be WiFi, Bluetooth, Zigbee, or other wireless protocol. Examples of other operating parameters that could be measured include speed, vibration, pressure, torque, and oil condition. Of course, a different operating system other than the one employed herein will be used to measure those other parameters, namely, speed, vibration, pressure, torque, and oil.

The signal transmitted by the peripheral gearbox sensor is received by a central device such as a smartphone or a display module that includes a combination of features such as lights, an information screen, and/or a Controller Area Network (CAN) connection hardwired to a vehicle controller. The signal could also be received by a computer and transmitted to a cloud storage service. From the cloud, the transmission manufacturer or the vehicle manufacturer can notify the owner/lessee of the equipment that service is needed.

During operation, the temperature measurement device interacts with the gearbox to provide a wireless electromagnetic signal that represents the operating temperature of the components of the gearbox. The temperature sensor will be subjected to a heat source (oil and ambient volume) within the gearbox that causes its resistance or other property to change with temperature. The heat source is the oil and the atmosphere within the rotating or stationary gearbox. If the various components of the transmission experience an increase in temperature, there may be too much friction in the components. Increased friction then imparts an increase in the oil temperature which is sensed by the thermistor (temperature sensor).

A power source such as a battery or energy harvesting device provides the electrical potential (energy) for the electronics, the sensor, the transceiver and other components of the temperature measurement device to operate. The wireless output signal of the temperature measurement device is conditioned by the electronics assembly and provided as input to the microcontroller, which includes the software required. The microcontroller interfaces with or includes the wireless communication device (transceiver) and antenna. A control algorithm provides gearbox condition updates in a way that minimizes energy consumption in order to extend the life of the battery. When the temperature of the gearbox exceeds a threshold level, the circuit is activated to wirelessly transmit the signal to the operator or to a Controller Area Network (control system) which is set up to control the operation of the gearbox/transmission by controlling the speed and input torques to the gearbox/transmission. Moreover, there may be any number of threshold limits established to provide various levels of alert to the operator or the control system. One example given herein, is the use of three (3) temperature threshold limits which are set for alarm or control action.

The main advantage of the temperature device is that it provides critical information about the temperature of the oil within the stationary or rotating gearbox. This allows decisions to be made concerning operation, maintenance, performance, or life expectancy of the gearbox, its components, or the larger machine in which the gearbox is installed. The larger machine is typically a tractor used on a farm, a truck used in a mining operation, an earth mover operating above or below ground.

Another advantage is that the wireless gearbox temperature sensor can be installed as a retrofit in existing gearboxes without significant (or in most cases any) modification to the gearbox(s) or machine(s). For instance, an existing fill or drain line in the cover plate may be used. The temperature measurement device may simply be threadedly interconnected with the existing fill or drain line.

The temperature measurement device allows communication using various wireless methods including Bluetooth. The temperature measurement device may be interrogated by the operator if desired. For instance, the operator may feel that there is a problem with the drive system controlling one of the wheels of his tractor, truck etc. and he may interrogate the temperature measurement device to learn about the temperature, hence the friction, within the gearbox/transmission.

It is an object of the invention to provide a temperature measurement device in a transmission, comprising: a rotatable housing; said rotatable housing drives a wheel affixed thereto; said temperature measurement device resides in a wall of said rotating housing; said rotatable housing is partially filled with oil for lubrication of transmission components; said temperature measurement device is rotated through said oil and out of said oil within said rotatable housing; and, said temperature measurement device includes a wireless transceiver in communication with a thermistor embedded within a sensor housing.

It is an object of the invention to provide a temperature measurement devices in a transmission in combination with a control system, comprising: a rotatable housing; said rotatable housing drives a wheel affixed thereto; said temperature measurement device resides in a wall of said rotatable housing; said rotatable housing is partially filled with oil for lubrication of transmission components; said temperature measurement device is rotated through said oil and out of said oil within said rotatable housing; said temperature measurement device includes a wireless transceiver in communication with a thermistor embedded within a sensor housing; and, a control system for monitoring the temperature of the oil taking into consideration the operational condition of the transmission.

It is an object of the invention to provide a temperature sensor in a transmission wherein said temperature is mounted in the end cover plate.

It is an object of the invention to provide a transmission in combination with a temperature monitoring device and a device exterior to said transmission, comprising: said transmission includes a rotatable housing; said rotatable housing drives a wheel of a vehicle affixed thereto; said temperature monitoring device includes a housing, a wireless transceiver in communication with a thermistor embedded within molding, a battery embedded within said molding, and said molding resides within said housing of said temperature monitoring device; said temperature monitoring device resides in a wall of said rotatable housing and rotates therewith; said rotatable housing includes an interior volume, and said interior volume of said rotatable housing is partially filled with oil for lubrication of transmission components residing within said interior volume of said housing, said transmission components include a rotatable shaft, a rotatable gear, and a rotatable bearing; said temperature monitoring device is rotated through said oil and out of said oil within said rotating housing when said rotating housing is in motion; and said wireless transceiver in communication with said device exterior to said transmission, said wireless transceiver communicating a temperature measurement from said temperature sensor and battery state of charge information to said device exterior to said transmission.

BRIEF DESCRIPTION OF THE DRAWINGS

FIG. 9 is an end view of a transmission with the temperature measurement device mounted in the end plate and rotatable with the transmission.

FIG. 4A is a cross-sectional view of the transmission illustrating the temperature measurement device mounted in the cover plate.

FIG. 4C is an end view of the transmission similar to FIG. 4A with the transmission rotated upwardly and with the temperature measurement device out of the lubricating fluid within the transmission.

FIG. 4D is a cross-sectional view of the transmission in the position of FIG. 4C.

DETAILED DESCRIPTION

Figure 6:
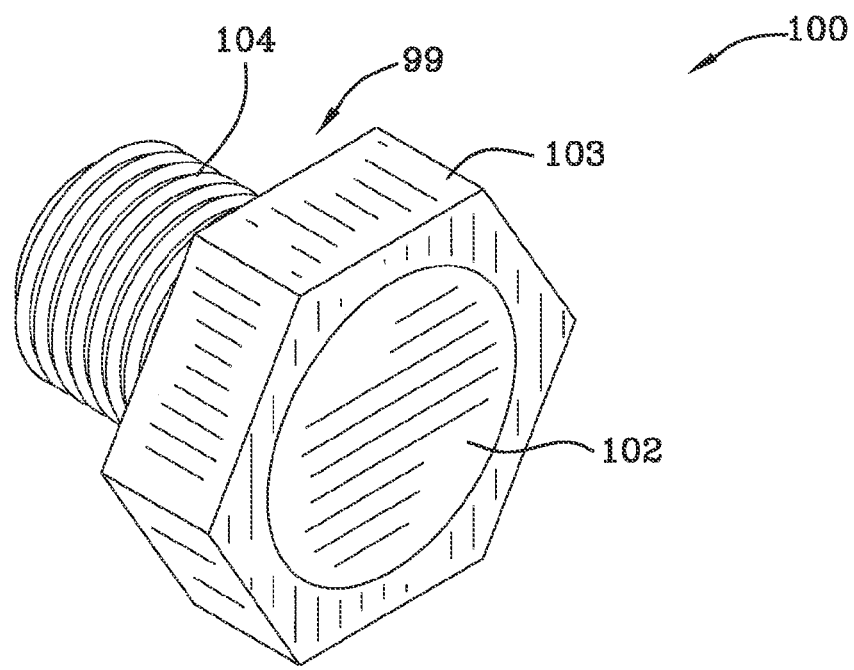
FIG. 6 is a perspective view of the temperature measurement device.

The wireless gearbox temperature device 99 communicates the thermistor voltage 512 and battery voltage 513 measurements to a central device 558 so that the equipment operator can be notified of the gearbox temperature and battery state of charge. See FIG. 5B. In order to maximize the time between necessary battery 137 replacements, the microcontroller 555 of the wireless temperature measurement device 99 is placed in sleep mode 554 and is awakened and communicates updates only when certain conditions are met. An algorithm that accomplishes the energy savings is set forth in FIG. 5B and is discussed in more detail below.

The wireless gearbox temperature measurement device 99 is comprised of a temperature sensor 101S, an electronics assembly 101, molding material 102, and a metal housing 103. The body of the housing 103 includes threads 104 for assembly with a threaded aperture 401A in a cover plate 401C of a transmission 88 but may be mounted in a different way. The metal housing 103 can be made of plastic if so desired.

The electronics assembly 101 includes a circuit board assembly 131, wireless module 130, and a temperature sensor 101S. A battery 137 may be included. The wireless module 130 contains a microcontroller 555 and antenna 557 tailored for WiFi, Bluetooth, Zigbee, or other communication protocol. The temperature sensor 101S may be a thermistor, RTD (resistance temperature detector), capacitor, or thermocouple. If a capacitor is used it must be exposed directly to the oil in the fluid directly and not encased in molded material.

As shown in the various drawing figures, the electronics assembly 101 is encapsulated by the molding material 102 separately and then installed into the housing 103 or alternatively the molding 102 is performed while the electronics are within the housing 103.

The wireless gearbox temperature sensor 99 is shown in FIGS. 6 and 1A-1G. As shown in FIGS. 9 and 4A-4E, the wireless gearbox temperature measurement device is installed in a rotating gearbox. The temperature measurement device can be installed anywhere in the rotating gearbox as long it does not interfere with the gears, and other components within the gearbox. The temperature measurement device may be installed in one of the existing fill-drain plugs in the cover plate 401C. The wireless gearbox temperature measurement device 99 may also be used in a stationary gearbox. In the example set forth herein, the wireless temperature measurement device 99 is used in a rotatable gearbox 88, the gearbox includes an outer drum or housing 428 which rotates the measurement device in and out of the oil (lubricating fluid) 401F. Depending on the oil level 401L within the gearbox 88, and the speed of rotation of the outer drum or housing 428, the temperature measurement device is constantly subjected to different submersion times within the oil 401F depending on the operational conditions of the transmission 88. Various operational parameters may be controlled as preferably set forth in FIG. 5B.

Figure 5A:
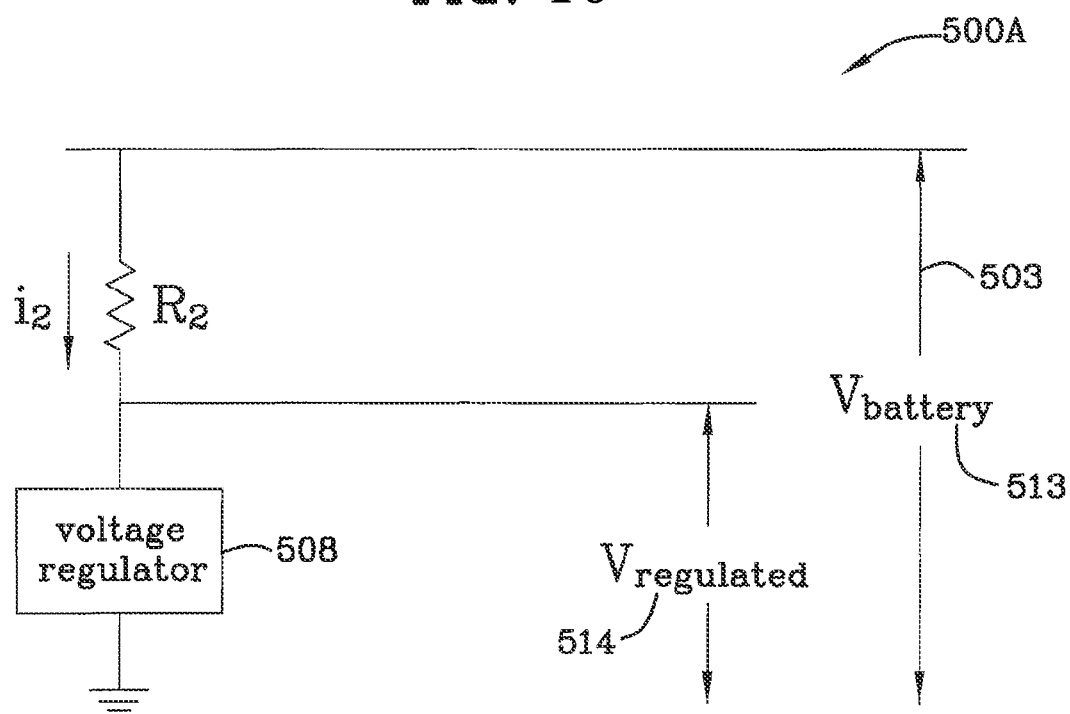
FIG. 5A is an electrical schematic of a battery voltage measurement and voltage across the voltage regulator.
Figure 5B:
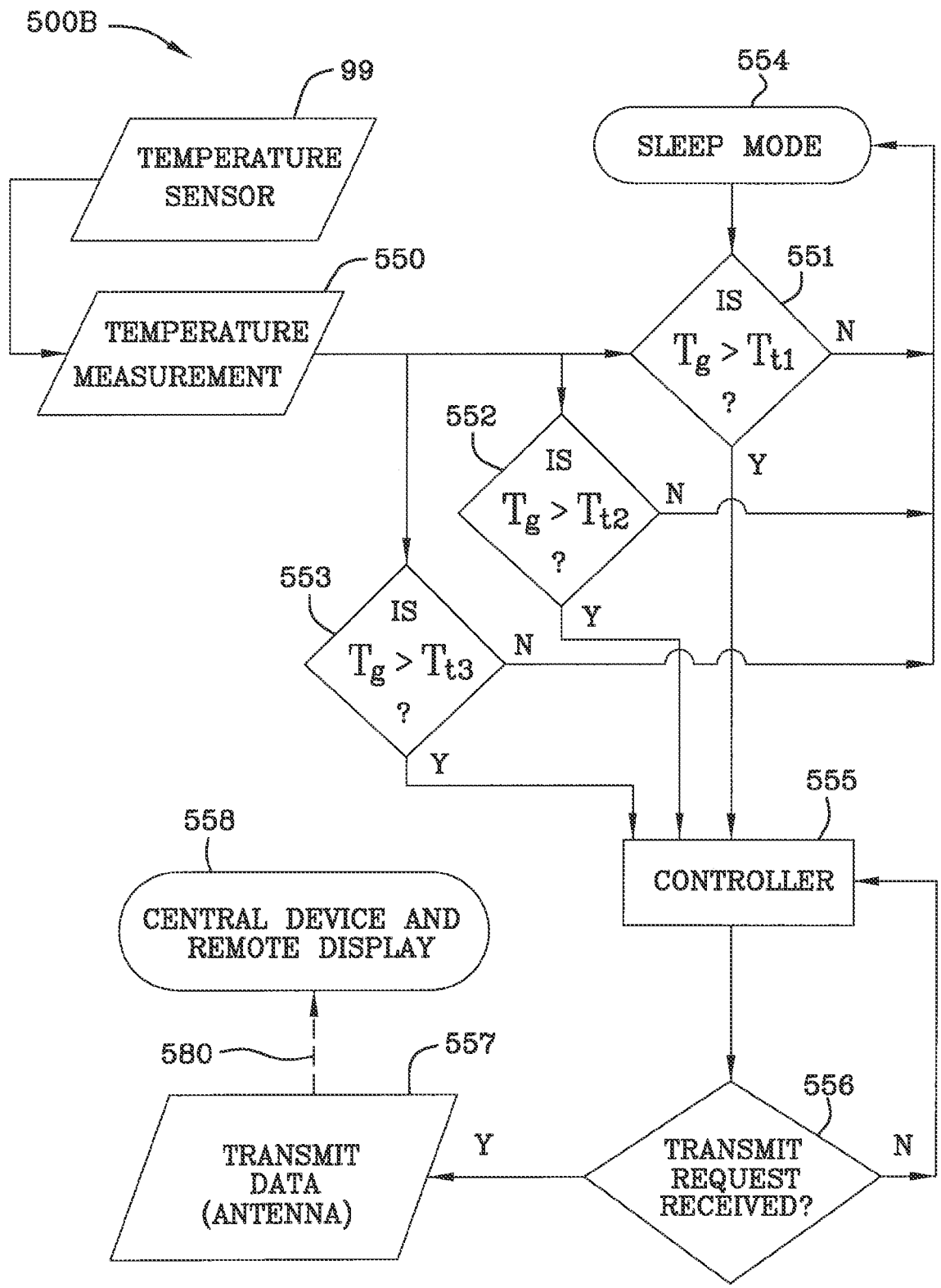
FIG. 5B is a schematic of the transceiver logic for the temperature measurement device and the display device/controller.

FIG. 5B is a schematic 500B of transceiver logic for the temperature measurement using the temperature sensor 99. Temperature sensor 99 senses the temperature of the oil 401F and the atmosphere 401E of the gearbox if the gearbox is rotating. If the gearbox is not rotating then, the temperature measurement device 99 may be located within the oil 401F which resides generally below the centerline of the gearbox. Still referring to FIG. 5B, the temperature sensor 99 provides a temperature measurement 550 which is input into comparator 551 wherein the gearbox temperature, Tg, 550 is compared to three different thresholds Tt1, Tt2, and Tt3. For instance, the first threshold Tt1 indicates the first temperature level that the operator or control system should be aware of. Two additional temperature thresholds are indicated in FIG. 5B. as Tt2 and Tt3. Tt2 is another temperature level requiring a more severe and more frequent warning to the operator indicating possible/probable degradation of the oil 401F within the gearbox. Higher oil 401F temperatures in the gearbox 88 can be an indication of problems in the gearbox, for instance increased friction between gears, splines, and bearings and other components will cause the oil temperature to increase. Still further, a third temperature level Tt3 may be employed which provides an indication of a yet more urgent condition (i.e., oil temperature and hence transmission degradation) to the operator or the control system. The control system may employ CAN architecture which receives a wireless temperature measurement from the temperature measurement device. The control device 558 receives the temperature measurement of the oil 401F within the transmission 88. The control device may be a remote display of any type, a smart phone, a pad, a personal computer (laptop) or any other device using any known transmission protocol 580.

Still further, different control schemes may be utilized. For instance, derivative control is used in temperature processes to anticipate the future value of the temperature where the process changes consistently. Degradation of the lubricating fluid (oil) 401F in a transmission is usually a slow process if everything within the transmission is working properly and therefore prediction of problems (based on derivative control aspects) with a slowly changing process variable such as temperature are not necessary or informative due to the extremely long-time constants involved. However, derivative control is useful where the process variable is changing consistently with a reasonably short time constant. Thermistors are preferably used as the sensor of choice as they provide a shorter time constant, or, put another way, a faster response as compared to a thermocouple. FIG. 5B is a schematic of the transceiver logic for the temperature measurement.

Still referring to FIG. 5B, if the comparators 551, 552, 553 do not indicate action to be taken, then the logic goes into sleep mode 554. The logic will continuously sample the temperature measurement 550, Tg, for evaluation against the thresholds Tt1, Tt2 and Tt3.

Still referring to FIG. 5B, if the comparators 551, 552, 553, indicate an alarm condition or a condition where action must be taken by the operator or a control system, then the comparator signals the controller 555 which will periodically indicate that the transmitter 557 sends a wireless transmit data request 556 to the remote display 558 and/or Controller Area Network (CAN) connection hardwired to the vehicle controller. The remote display 558 may be an instrument mounted on the control panel of the vehicle or it may be a handheld device such as a smartphone, a computerized pad device, laptop computer, and the like. Further, the wireless signal 580 emanating from the temperature measurement device can also be sent to a controller on board the vehicle using anyone of several wireless protocol 580 such as WiFi, Blue Tooth etc. The controller is part of a CAN network which necessarily controls operation of the wheels of the vehicle. As stated herein, the gearbox/transmission 88 is driven by an electric motor or hydraulic motor.

FIG. 4A is a cross-sectional view 400A of the transmission 88 illustrating the temperature measurement device mounted in the cover plate 401C. The driving device (not shown) of the transmission may be an electric or hydraulic motor controlled by the vehicle operator or controlled by an on-board control system. The driving device powers the gearbox and the wheel affixed thereto. The driving devices are controlled by the operator or by an on-board control system.

Figures 2A, 7:
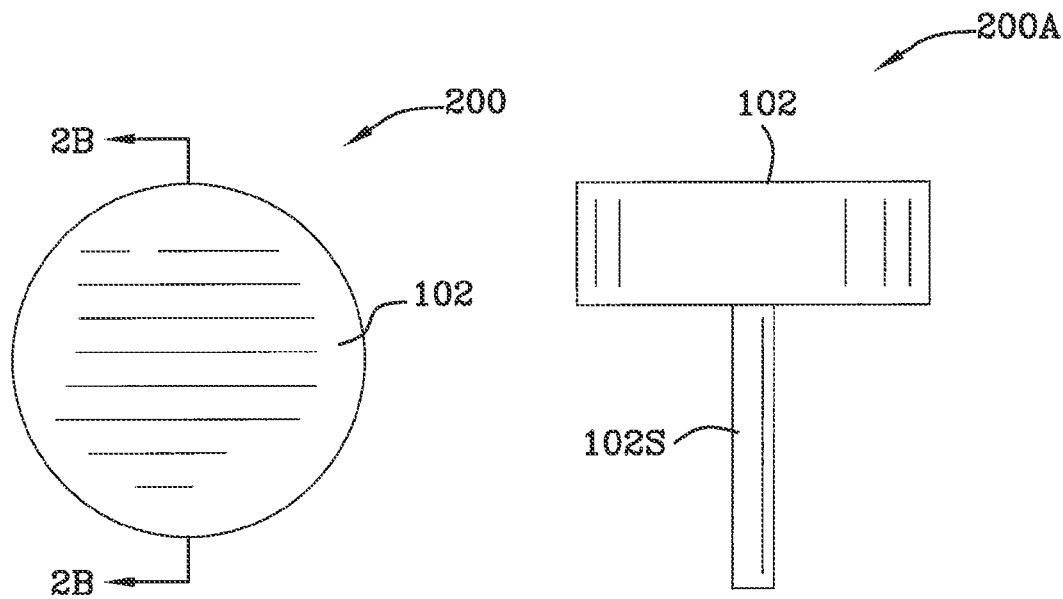
FIG. 7 is a top view of the molding covering the electronics (including the battery) transceiver and temperature sensor of the temperature measurement device.
FIG. 2A is a side view of the molding covering the electronics (including the battery), transceiver and temperature sensor of the temperature measurement device.

FIG. 6 is a perspective view 100 of the temperature measurement device 99. Molding 102 surrounds the electronics 101, the battery 137, the transceiver 130 and the temperature measurement sensor 1015. See FIG. 2B which is a cross-sectional view 200B of the temperature measurement device 99 taken along the lines 2B-2B of FIG. 7. FIG. 7 is a top view 200 of the molding 102 surrounding the electronics 101 and the temperature measurement sensor 1015. A threaded shank 104 is illustrated in FIG. 6 and is used to secure the temperature measurement device 99 to a corresponding threaded aperture 401A in the cover 401C of the transmission.

Figure 1A:
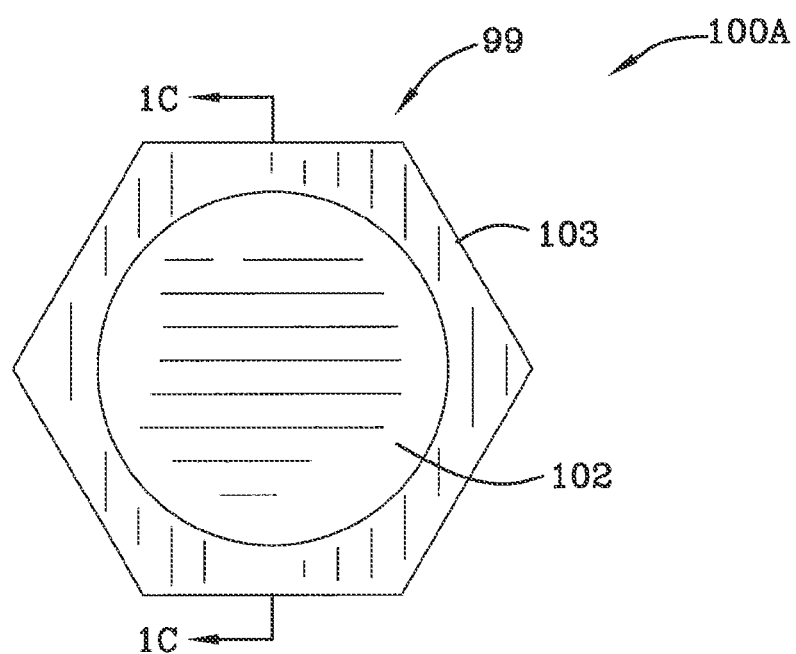
FIG. 1A is a top view of the temperature measurement device.
Figure 1B:
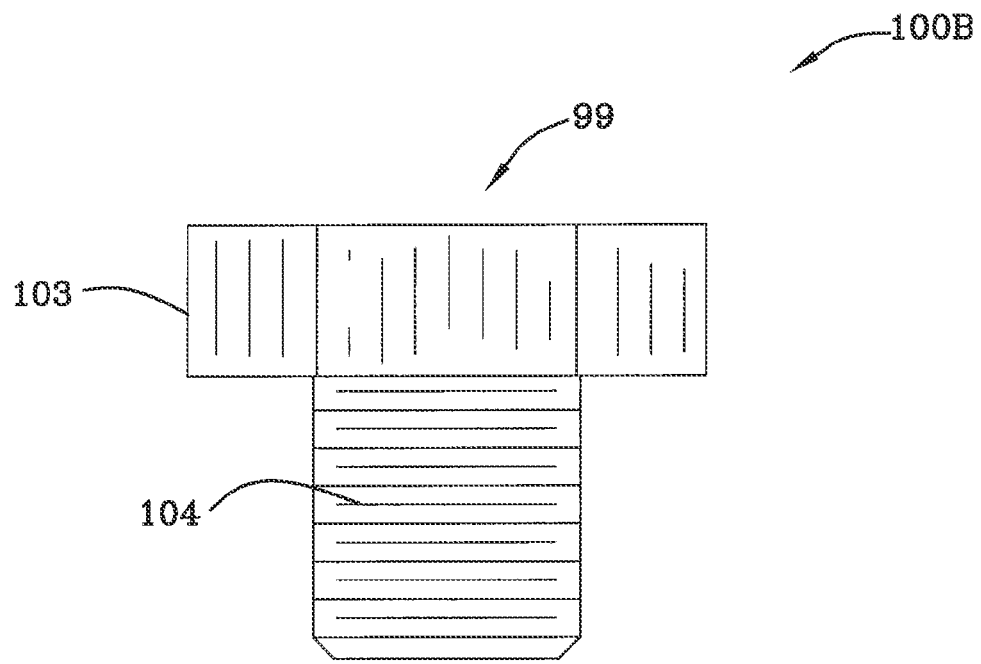
FIG. 1B is a side view of the temperature measurement device.
Figure 10:
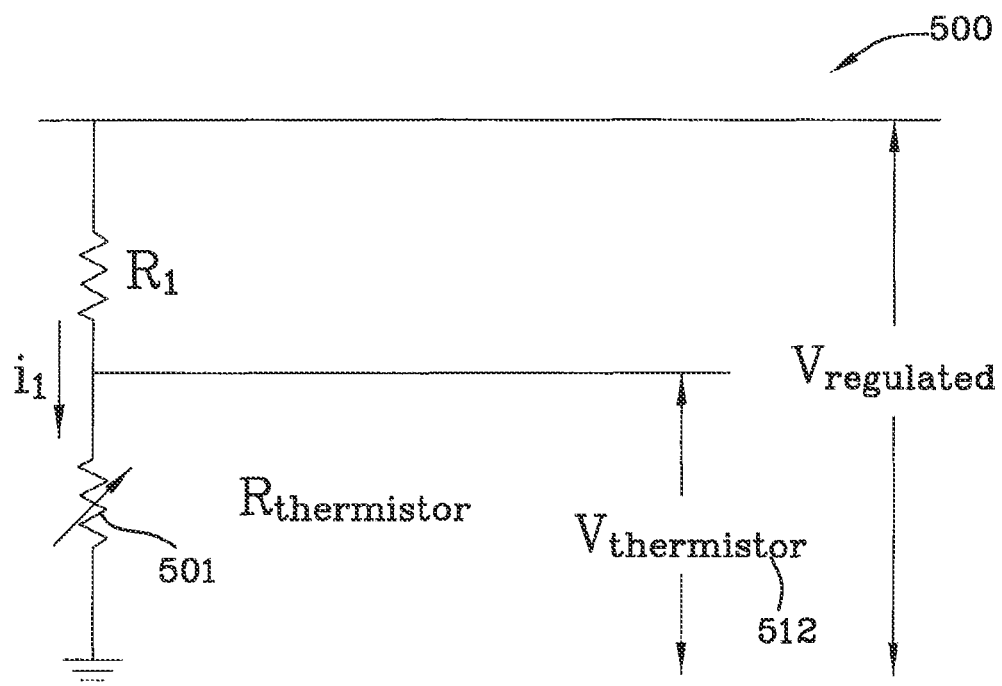
FIG. 10 is an electrical schematic of a thermistor used as a sensor element.

FIG. 1A is a top view 100A of the temperature measurement device 99. Metal housing 103 of the temperature measurement device 99 partially surrounds the molding 102. The molding 102 is secured to the metal housing 103 by heating the molding material such that it binds to the metal housing thus forming a temperature measurement device 99 having an integral temperature sensor 101S, electronics 101, molding 102, and housing 103. Alternatively, the molded material may be adhered to the metal housing using adhesive 103C. FIG. 10 indicates an arrow 103C which is the adhesive added to the interior surfaces to receive the electronics and sensor which are covered with molded material 102, 102S. FIG. 1B is a side view 100B of the temperature measurement device 99 illustrating the external threads 104.

Figure 1C:
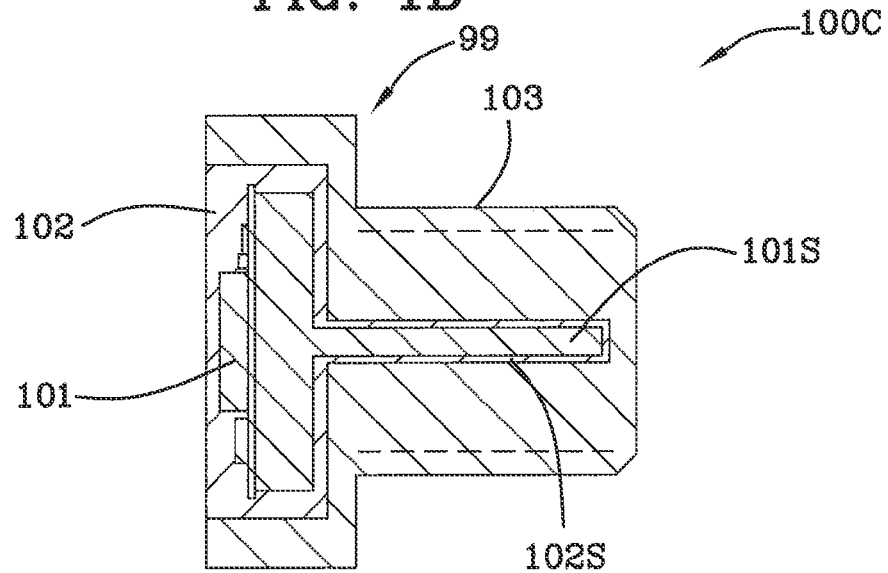
FIG. 1C is a cross-sectional view of the temperature measurement device taken along the lines 1C-1C of FIG. 1A.
Figure 1D:
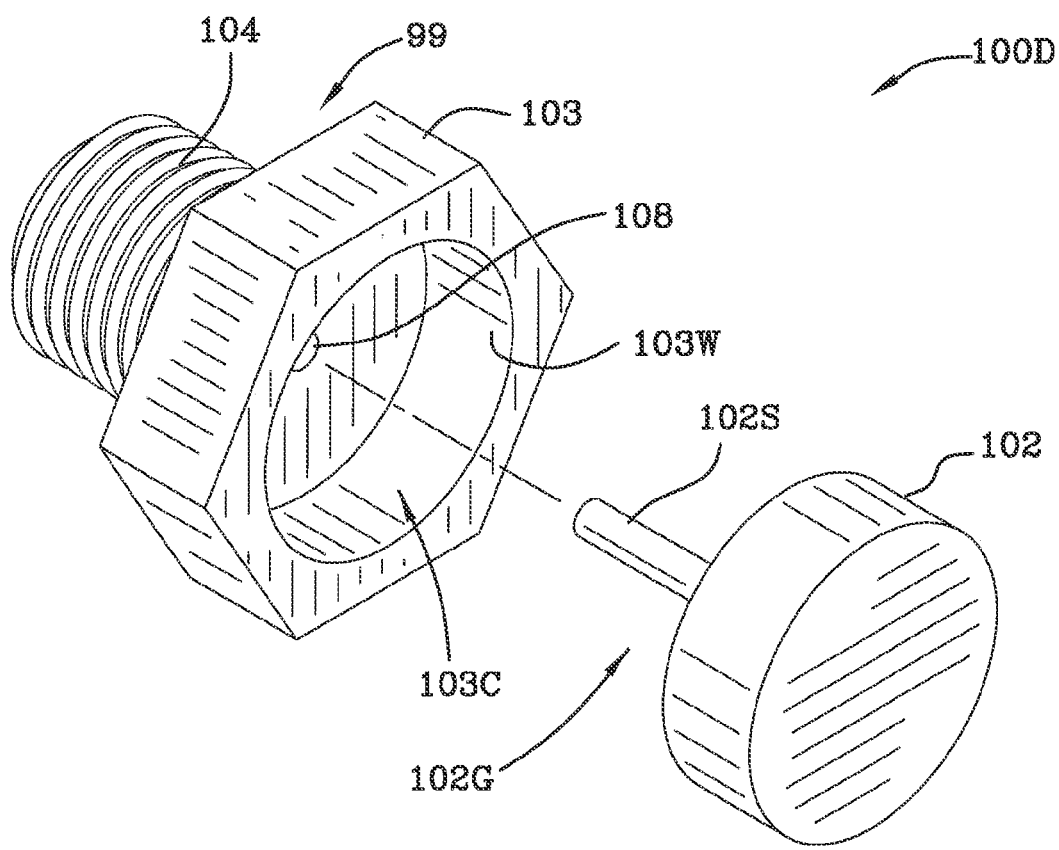
FIG. 1D is an exploded view of the temperature measurement device.
Figure 1E:
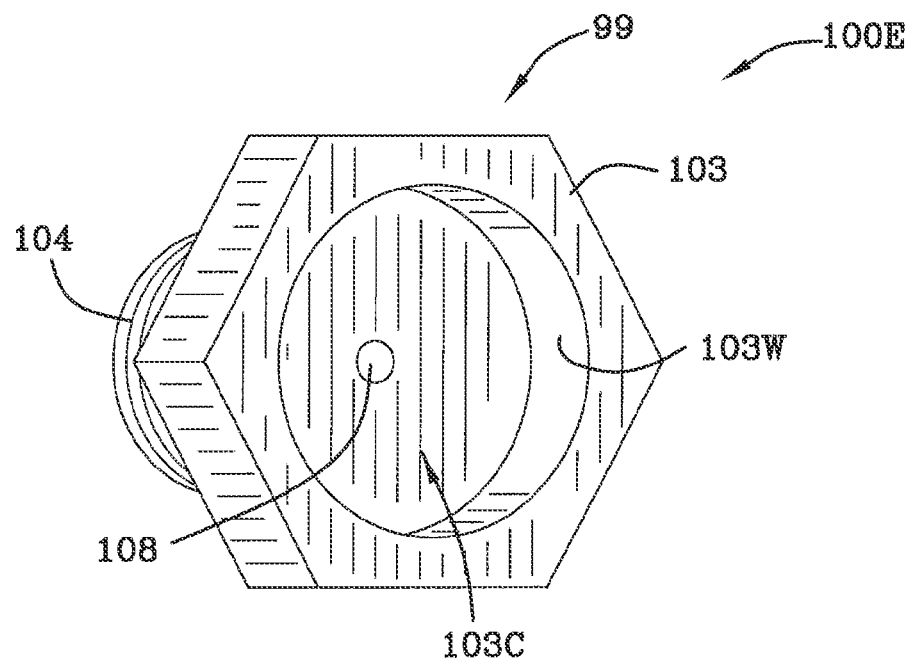
FIG. 1E is an end view of the housing of the temperature measurement device.

FIG. 1C is a cross-sectional view 100C of the temperature measurement device 99 taken along the lines 1C-1C of FIG. 1A. FIG. 1C illustrates the sensor 1015 and the electronics 101 embedded within molding 102. The electronics 101 includes the transceiver (transmitter, receiver and antenna) 130, supporting electronics 131 and battery 137. FIG. 1C also illustrates the molding 102 within the metal housing 103. The molding 102 is molded over the sensor 1015 and the electronics 101. The molded structure with the electronics and the sensor therein is then secured within a cavity 103C in the metal housing. The cavity 103C is formed by cylindrically shaped wall 103W. FIG. 1D is an exploded view 100D of the temperature measurement device 99 with the embedded sensor 1015 and the embedded electronics 101 within the molding 102S and the molding 102. Still referring to FIG. 1D, a cylindrical aperture 108 is illustrated along the centerline of the metal housing 103. FIG. 1E is an end view 100E of the metal housing 102 illustrating the cavity 103C and the cylindrical aperture 108. Cylindrical aperture 108 receives the sensor 1015 which is surrounded by molding 102S and cavity 103C receives the electronics (including the battery) portion 101 surrounded by molding 102 of the temperature measurement device 99. The battery 127 is in an integral portion of the electronics and can be any long-lasting battery. The molding 102S surrounds the sensor 101S and the molding 102 surrounds the electronics and battery 102. The molding can be made of any polymer capable of handling temperatures that are typically experienced in gearboxes.

Figure 1F:
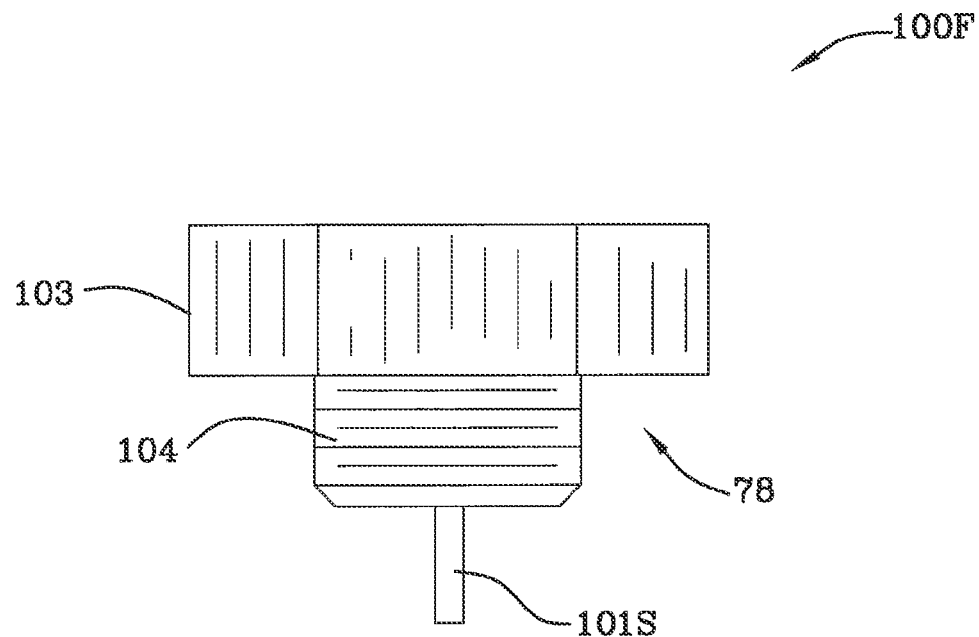
FIG. 1F is a side view of another example of the temperature measurement device without insulation covering the entire temperature sensor.
Figure 1G:
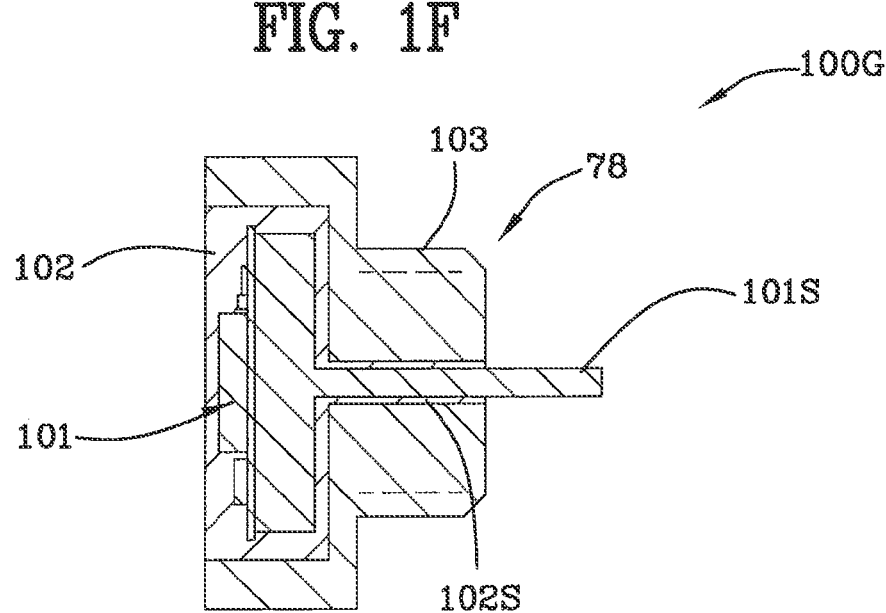
FIG. 1G is a cross-sectional view of the temperature measurement device illustrated in FIG. IF.

FIG. 1F is a side view 100F of another example of the temperature measurement device 78 without insulation covering the entire temperature measurement device 78. In particular, in this example the temperature sensor 101S is not completely covered with insulation. The example of FIG. 1F will provide faster time response because the sensor itself is in direct contact with the lubricating oil. FIG. 1G is a cross-sectional view 100G of the temperature measurement device 78 illustrated in FIG. 1E. FIG. 1G illustrates the temperature sensor 101S protruding outside the metal housing 103 and the insulation 102S.

Figure 2B:
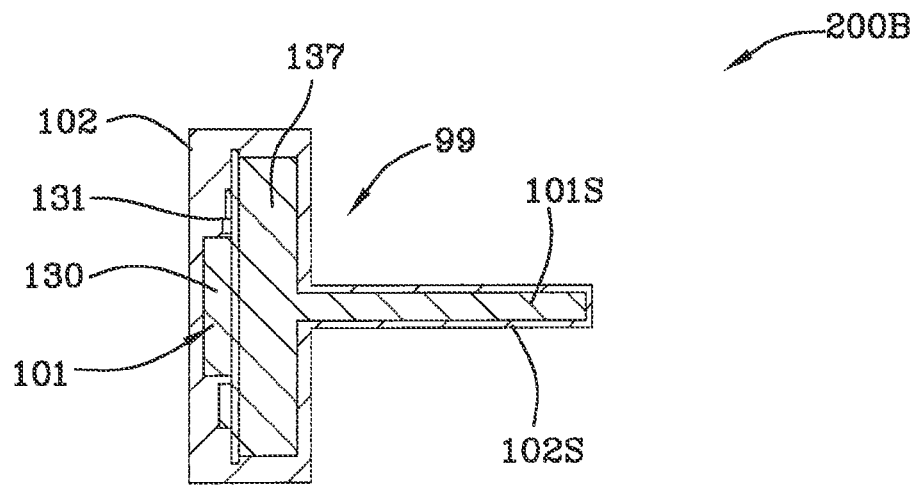
FIG. 2B is a cross-sectional view of the molding covering the electronics (including the battery), transceiver, battery and temperature sensor taken along the lines 2B-2B of FIG. 7.

FIG. 7 is a top view 200 of the molding 102 covering the electronics (including the battery) and temperature sensor of the temperature measurement device 99. FIG. 2A is a side view 200A of the molding 102, 102S covering the electronics (including the battery) 101 and temperature sensor 101S of the temperature measurement device 98. FIG. 2B is a cross-sectional view 200B of the molding covering the electronics (including the battery) 102 and temperature sensor 101S taken along the lines 2B-2B of FIG. 7. As previously stated, the insulation is molded over the electronics (including the battery) and temperature sensor of the temperature measurement device 99.

Figure 8:
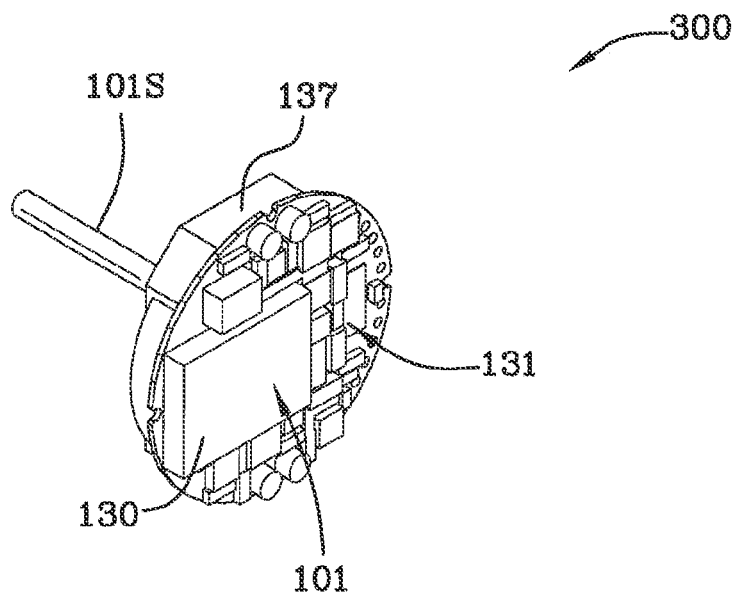
FIG. 8 is a perspective view of the temperature measurement device without the insulation illustrating the electronics, transceiver, battery and temperature sensor.
Figure 3A:
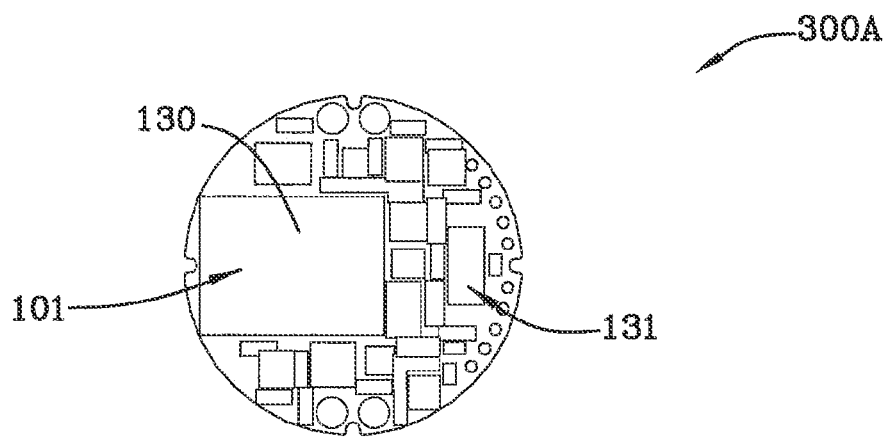
FIG. 3A is a top view of the temperature measurement device without the insulation illustrating the electronics and transceiver.
Figure 3B:
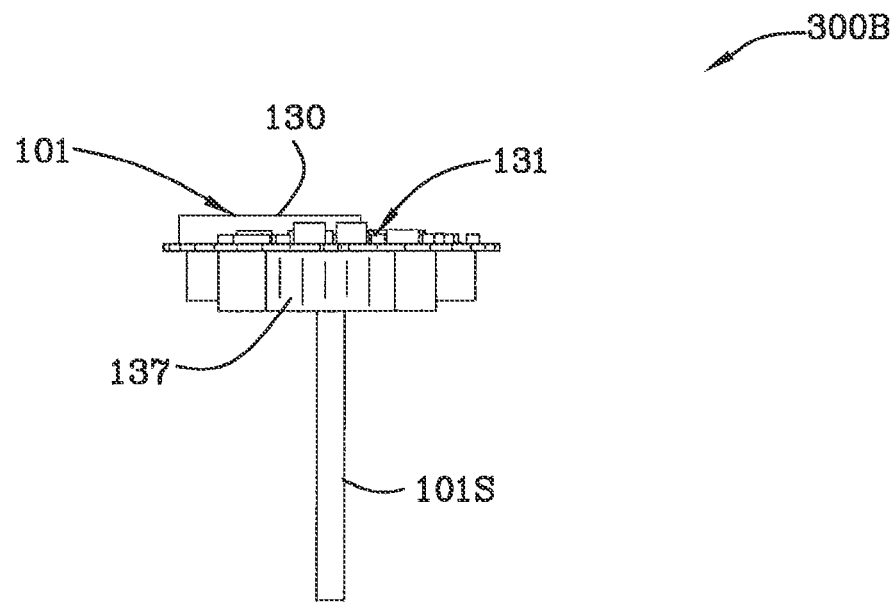
FIG. 3B is a side view of the temperature measurement device illustrating the transceiver, the electronics, battery and the temperature sensor.
Figure 3C:
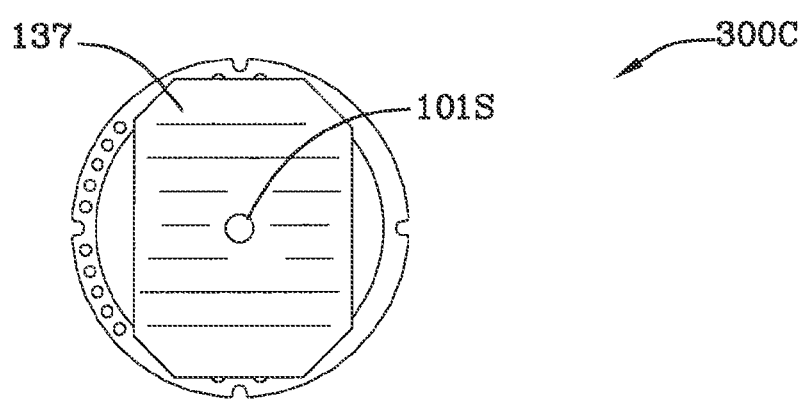
FIG. 3C is a bottom view of the temperature measurement device.

FIG. 8 is a perspective view 300 of the temperature measurement device without the insulation illustrating the electronics 101 including the battery 137 and the temperature sensor 101S. FIG. 3A is a top view 300A of the temperature measurement device 99 without the insulation illustrating the electronics 101 including the transceiver 130, supporting electronics 131, and battery 137. FIG. 3B is a side view 300B of the electronics 101, battery 137, and the temperature sensor 101S of the temperature measurement device 99 illustrated in FIGS. 8 and 3A. FIG. 3C is a bottom view 300C of the electronics 101, battery 137 and the temperature sensor 101S of the temperature measurement device 99.

Figure 4B:
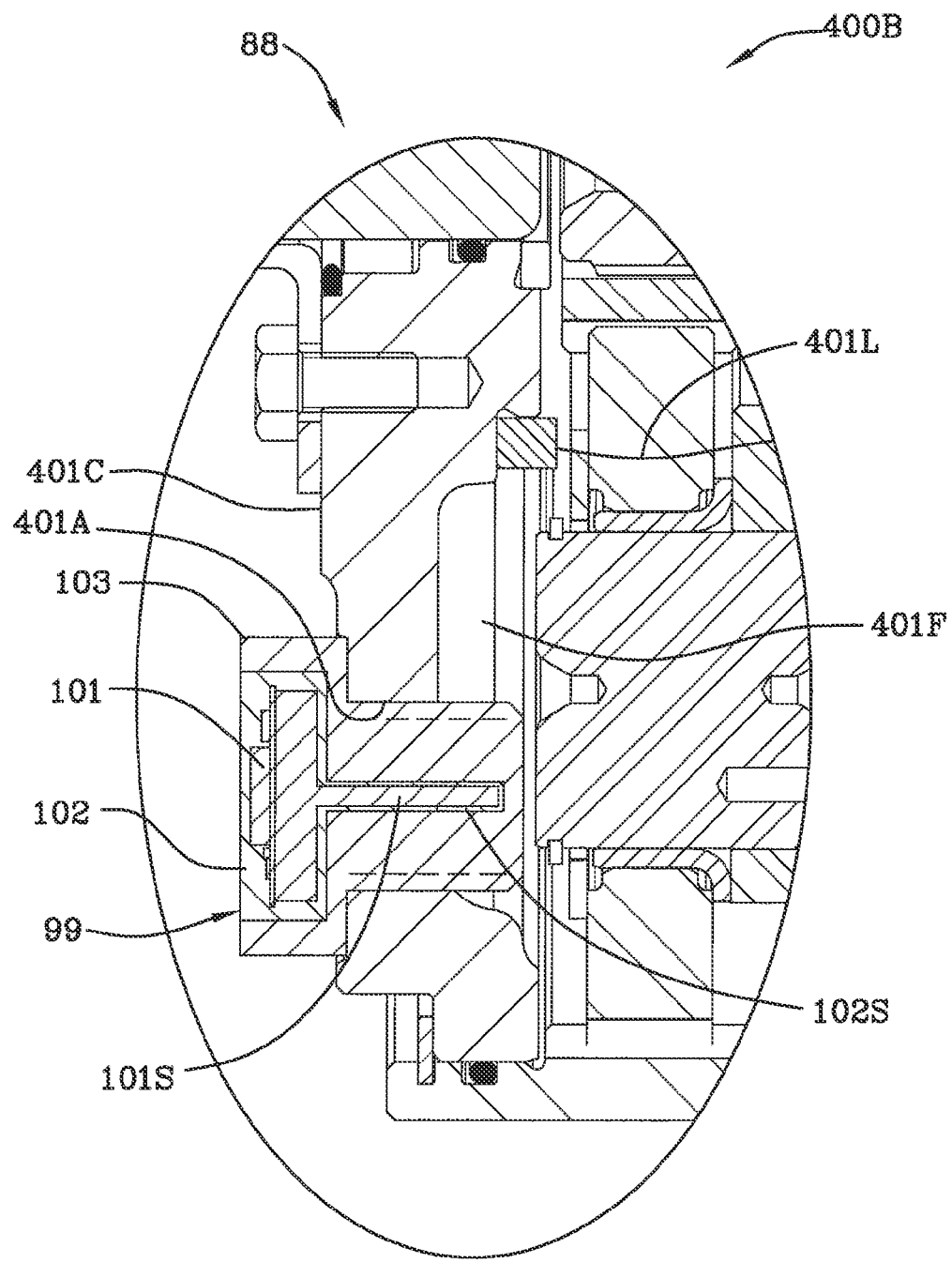
FIG. 4B is an enlarged view of a portion of FIG. 4A illustrating the temperature measurement device in the cover plate.

FIG. 9 is an end view 400 of a transmission 88 with the temperature measurement device 99 mounted in the rotatable cover plate 401C rotating with the transmission 88. It is noted that the temperature measurement device 99 is located at the bottommost rotational position. FIG. 4A is a cross-sectional view 400A of the transmission 88 taken along the lines 4A-4A of FIG. 9 illustrating the temperature measurement device 99 mounted in the cover plate 401C. FIG. 4A illustrates the temperature measurement device 99 in the bottommost rotational position. Still referring to FIG. 4A, reference numeral 401F indicates the lubricating oil (lubricating fluid) and reference numeral 401L indicates the level of the lubricating oil (lubricating fluid). FIG. 4B is an enlarged view 400B of a portion of FIG. 4A illustrating the temperature measurement device 99 mounted in an aperture 401A of the cover plate 401C, the cover plate of the transmission 401C, the lubricating fluid 401F and the level of the lubricating fluid 401L.

Figure 4E:
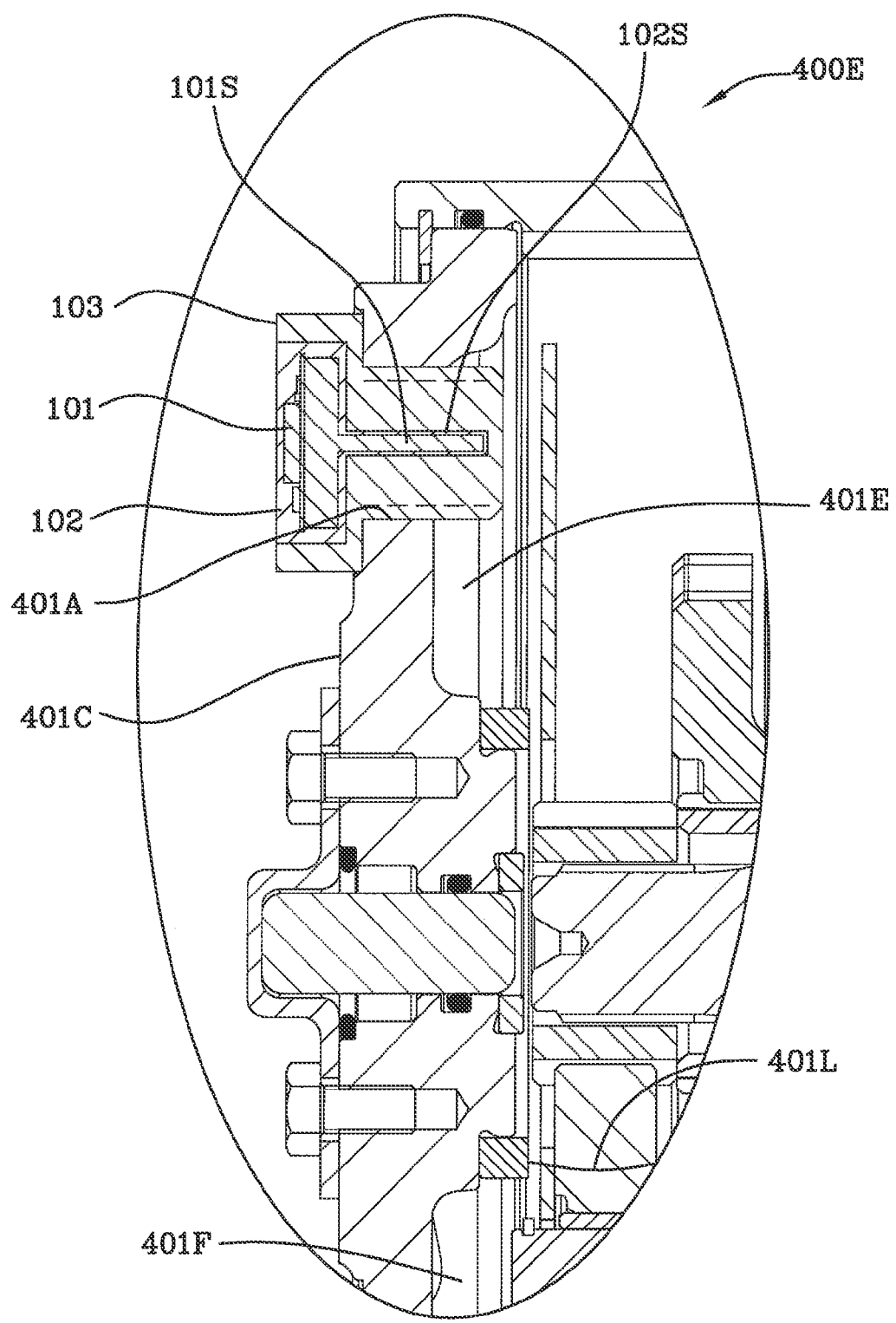
FIG. 4E is an enlarged view of a portion of FIG. 4D illustrating the temperature measurement device in the cover plate.

FIG. 4C is an end view 400C of the transmission 88 similar to FIG. 4A with the transmission 88 rotated upwardly and with the temperature measurement device 99 out of the lubricating fluid 401F and in the uppermost position of the rotatable transmission above the oil line 401L. FIG. 4D is a cross-sectional view 400D of the transmission 88 in the position of FIG. 4C. In the position as shown in FIGS. 4C and 4D, the temperature measurement device 99 is illustrated above the lubricating fluid level 401L. FIG. 4E is an enlarged view 400E of a portion of FIG. 4D illustrating the temperature measurement device 99 mounted in an aperture 401A of the cover plate 401C, above the fluid level 401L. Reference numeral 401E indicates a volume within the transmission 88 which does not have lubricating fluid.

FIG. 10 is an electrical schematic 500 of a thermistor 501 used as a sensor element 101S. A circuit schematic for a thermistor 501 is shown in FIG. 10 and a circuit schematic 500A for battery voltage 513 measurement is provided in FIG. 5A. As the gearbox heats and cools, the resistance of the thermistor 501 changes and therefore so does the voltage 512 across the thermistor. The battery voltage will decrease over the course of the wireless gearbox temperature device operation. A voltage regulator 508 provides a relatively fixed voltage 514 that can be used as a reference to determine the thermistor voltage 512 and the battery voltage 503.

A method of manufacturing a temperature measurement device is also disclosed herein, comprising the steps of: arranging a battery and an electronic assembly such that the battery forms a support for, and provides power to, a printed circuit board populated with integrated electronic components for the operation of a wireless transceiver and a temperature sensor; placing the battery and electronic assembly including the printed circuit board, the wireless transceiver and the temperature sensor into a cavity and injecting a polymer into the cavity forming a cylindrical mold having a first diameter and a cylindrical mold having a second diameter; allowing the polymer to harden and then removing molded material encasing the battery, electronic assembly and printed circuit board from the cavity; inserting the removed molded material encasing the battery, electronic assembly, printed circuit board, and the temperature into a reciprocally shaped housing.

The method of manufacturing a temperature measurement device further comprises: coating an interior portion the reciprocally shaped housing with adhesive before inserting the removed molded material encasing the battery, electronic assembly, printed circuit board, and the temperature into the reciprocally shaped housing.

REFERENCE NUMERALS

78—temperature measurement device
88—transmission/gearbox;
99—temperature measurement device;
100—a perspective view of the temperature measurement device;
100A—a top view of the temperature measurement device;
100B—a side view of the temperature measurement device;
100C—a cross-sectional view of the temperature measurement device taken along the lines 1C-1C of FIG. 1A;
100D—an exploded view of the temperature measurement device;
100E—an end view of the housing of the temperature measurement device;
100E—a side view of another example of the temperature measurement device without insulation covering the entire temperature sensor;
100G—a cross-sectional view of the temperature measurement device illustrated in FIG. 1F;
101—arrow indicating the electronics including the wireless module 131 (transceiver including the antenna);
101S—temperature sensor, for example RTD, thermistor, thermocouple;

102—molded material surrounding the electronics, transceiver including the antenna;
102S—molding surrounding the temperature sensor;
103—housing of the temperature measurement device;
103C—cavity of the housing
103W—cylindrical wall of the housing 103;
104—threaded portion of the housing 103 of the temperature measurement device 99;
108—cylindrical bore or aperture in the metal housing to provide space for the temperature sensor 1015 and the molding 102S thereover;
131—transceiver;
137—battery powering the temperature measurement device;
200—a top view of the molding covering the electronics (including the battery), transceiver and temperature sensor of the temperature measurement device;
200A—a side view of the molding covering the electronics (including the battery), transceiver and temperature sensor of the temperature measurement device;
200B—A cross-sectional view of the molding covering the electronics (including the battery), transceiver, battery and temperature sensor taken along the lines 2B-2B of FIG. 7;
300—a perspective view of the temperature measurement device without the insulation illustrating the electronics, transceiver, battery and temperature sensor;
300A—a top view of the temperature measurement device without the insulation illustrating the electronics and transceiver;
300B—a side view of the temperature measurement device illustrating the transceiver, the electronics, battery and the temperature sensor;
300C—a bottom view of the temperature measurement device;
400—an end view of a transmission with the temperature measurement device mounted in the end plate and rotatable with the transmission;
400A—a cross-sectional view of the transmission illustrating the temperature measurement device mounted in the cover plate;
400B—an enlarged view of a portion of FIG. 4A illustrating the temperature measurement device in the cover plate;
400C—an end view of the transmission similar to FIG. 4A with the transmission rotated upwardly and with the temperature measurement device out of the lubricating fluid within the transmission;
400D—a cross-sectional view of the transmission in the position of FIG. 4C;
400E—an enlarged view of a portion of FIG. 4D illustrating the temperature measurement device in the cover plate;
401A—threaded aperture in the cover plate 401C;
401C—cover plate on the end of the transmission/gearbox 88;
401E—indicates a volume without oil present;
401F—indicates oil in a volume;
401L—oil level within the transmission/gearbox 88;
428—rotatable housing;
500—an electrical schematic of a thermistor used as a sensor element;
500A—an electrical schematic of a battery voltage measurement and voltage across the voltage regulator;
500B—a schematic of the transceiver logic for the temperature measurement device and the display device/controller;
501—thermistor, variable resistance;
502—fixed resistor;
I1—current through thermistor;
503—battery voltage;
504—fixed resistance;
508—voltage regulator;
I2—current through voltage regulator;
513—battery;
514—voltage regulated;
550—temperature measurement;
551—comparator, Tg>Tt1;
552—comparator, Tg>Tt2;
553—comparator, Tg>Tt3;
554—sleep mode;
555—controller;
556—logic, if then, transmit request received;
557—transmit data (antenna);
558—control device; remote display, smart phone, pad, laptop computer and/or controller area network;
580—wireless protocols WiFi, Bluetooth, Zigbee, or others.

The invention claimed is:

1. A method of manufacturing a temperature measurement device, comprising the steps of:
arranging a battery and an electronic assembly such that said battery forms a support for, and provides power to, a printed circuit board populated with integrated electronic components for the operation of a wireless transceiver and a temperature sensor;
placing said battery and electronic assembly including said printed circuit board, said wireless transceiver and said temperature sensor into a cavity and injecting a polymer into said cavity forming a cylindrical mold having a first diameter and a cylindrical mold having a second diameter;
allowing said polymer to harden and then removing molded material encasing said battery, electronic assembly and printed circuit board from said cavity;
inserting said removed molded material encasing said battery, electronic assembly, printed circuit board, and said temperature sensor into a reciprocally shaped housing, and the housing is shaped as a threaded plug; and
threading the threaded plug into a fluid conduit.

2. The method of claim 1, further comprising:
coating an interior portion said reciprocally shaped housing with adhesive before inserting said removed molded material encasing said battery, electronic assembly, printed circuit board, and said temperature into said reciprocally shaped housing.

3. The method of claim 1, wherein the temperature measurement device comprises a thermistor embedded in the molded material.

4. The method of claim 1, further comprising:
determining if a fluid temperature is greater than at least one temperature threshold,
if the fluid temperature is greater than the at least one temperature threshold, provide an alarm or control action, and
if the fluid temperature is less than the at least one temperature threshold, enter a sleep mode.

5. The method of claim 1, wherein inserting the molded material comprises inserting an end of the temperature sensor through an aperture in the threaded plug such that an end of the temperature sensor extends out of the threaded plug.

6. The method of claim 5, wherein the end of the temperature sensor that extends out of the threaded plug directly contacts lubricant of the transmission.

7. The method of claim 6, wherein rotation of the temperature measurement device with a portion of the transmission brings the end of the temperature sensor that extends out of the threaded plug into contact with the lubricant and out of contract with the lubricant.

8. The method of claim 1, wherein the temperature sensor is completely enclosed within the housing.

9. The method of claim 1, wherein the transceiver configured to send and receive wireless communications is embedded in the molded material.

10. The method of claim 1, further comprising operating the temperature measurement device and performing a routine comprising:
  determining if a fluid temperature is greater than at least two temperature thresholds,
  if the fluid temperature is greater than a first threshold, provide a first alarm or control action, and
  if the fluid temperature is greater than a second threshold, provide a second alarm or control action different from the first alarm or control action.

11. A method of manufacturing a temperature measurement device, comprising the steps of:
  arranging a battery and an electronic assembly such that said battery forms a support for, and provides power to, a printed circuit board;
  placing said battery, and an electronics assembly comprising the printed circuit board, a wireless transceiver and a temperature sensor into a cavity and injecting a polymer into said cavity forming a mold;
  allowing said polymer to harden and then removing molded material encasing said battery and said electronic assembly from said cavity;
  inserting said removed molded material encasing said battery and said electronic assembly into a reciprocally shaped housing:
  installing the housing into a rotating component, and
  wherein the wireless transceiver is embedded in the molded material and the wireless transceiver is configured to send and receive wireless communications to an external device.

12. The method of claim 11, wherein the rotating component is part of a transmission, and
  wherein the battery, electronic assembly, and printed circuit board are positioned on a first end of the housing positioned distal from lubricant of the transmission and the temperature sensor extends from the distal end toward the lubricant of transmission.

13. The method of claim 11, wherein the rotating component is part of a transmission,
  further comprising rotating the rotatable housing;
  wherein the temperature measurement device comprises a thermistor embedded in the molded material;
  rotating the temperature measurement device through fluid within the rotatable housing;
  wirelessly communicating a temperature measurement from the temperature measurement device to an exterior of the transmission.

14. The method of claim 13, wherein the wall of the rotatable housing is a cover plate.

15. The method of claim 13, wherein a housing of the temperature measurement device comprises a conductive metal.

16. The method of claim 13, wherein the wireless transceiver is embedded in the molded material.

17. The method of claim 13, wherein inserting the molded material into the housing forms an integral environmentally sealed unit.

18. The method of claim 13, further comprising determining if a fluid temperature is greater than at least one temperature threshold, and if the fluid temperature is greater than the at least one temperature threshold, provide an alarm or control action.

* * * * *